United States Patent [19]

Saam et al.

[11] 3,873,636

[45] Mar. 25, 1975

[54] BLOCK COPOLYMER OF A VINYL MONOMER AND A POLY-3,3,3-TRIFLUOROPROPYLMETHYL-SILOXANE

[75] Inventors: John C. Saam; Frederick W. G. Fearon, both of Midland, Mich.

[73] Assignee: Dow Corning Corporation, Midland, Mich.

[22] Filed: Sept. 17, 1973

[21] Appl. No.: 398,059

Related U.S. Application Data

[63] Continuation of Ser. No. 66,896, Aug. 25, 1970, abandoned.

[52] U.S. Cl. ... 260/827, 260/30.4 SB, 260/33.8 SB, 260/46.5 G, 260/46.5 UA, 260/825, 260/874, 260/901, 260/894, 260/898

[51] Int. Cl. .. C08f 33/08, C08g 47/06, C08g 47/10

[58] Field of Search .......................................... 260/827

[56] References Cited

UNITED STATES PATENTS

| | | | |
|---|---|---|---|
| 3,051,684 | 8/1962 | Morton | 260/827 |
| 3,483,270 | 12/1969 | Bostick | 260/827 |
| 3,691,257 | 12/1972 | Kendrick et al. | 260/827 |

*Primary Examiner*—Wilbert J. Briggs, Sr.
*Attorney, Agent, or Firm*—Roger H. Borrousch

[57] ABSTRACT

A block copolymer having at least one block of a vinylic polymer and at least one block of a poly-3,3,3-trifluoropropylmethylsiloxane is useful as a dispersant for mixtures of vinylic polymers and poly-3,3,3-trifluoropropylmethylsiloxane.

4 Claims, No Drawings

BLOCK COPOLYMER OF A VINYL MONOMER AND A POLY-3,3,3-TRIFLUOROPROPYLMETHYLSILOXANE

This is a continuation of applicaton Ser. No. 66,896, filed Aug. 25, 1970, abandoned.

This invention relates to a block copolymer having at least one block of a vinylic polymer and at least one block of a poly-3,3,3-trifluoropropylmethylsiloxane.

Block copolymers are known broadly and the types of blocks as well as the arrangement of the blocks in the polymeric structure have received considerable attention, especially in the last decade. Block copolymers often possess unexpected properties in comparison to the random compolymer or mixtures of homopolymers, hence they are achieving a significant place in the polymer industry.

It has been taught that cyclic polysiloxanes can be polymerized with lithium compounds, such as lithium silanolates, to form polymers which have a regular nature and have a high degree of non-randomness as observed when copolymers are prepared, as shown by U.S. Pat. No. 3,337,497. However, it is also taught that the presence of halogen atoms on aliphatic carbon atoms of the organic radicals of the cyclic polysiloxanes should be avoided since the randomness of the formed polymer markedly increases. This is taught as being particularly true where the halogen atom is fluorine.

Thus, it is an object of the present invention to provide a polymer containing siloxanes with aliphatic radicals having fluorine atoms with a high degree of non-randomness. More specifically, a block copolymer having at least one block of a vinylic polymer and at least one block of a poly-3,3,3-trifluoropropylmethylsiloxane.

The present invention relates to a block copolymer consisting essentially of at least one organic block represented by the formula $$(CH_2-\underset{G}{CR'})_x \text{ or } (\underset{G}{CR'}-CH_2)_x R'''(CH_2-\underset{G}{CR'})_x$$

and at least one silicon containing block represented by the formula $$(\overset{CH_3}{\underset{CH_2CH_2CF_3}{SiO}})_y ,$$

said organic block being bonded to said silicon containing block through silicon-carbon bonds, represented by the formula $$-CH_2-\underset{G}{CR'}-\overset{CH_3}{\underset{CH_2CH_2CF_3}{SiO}}- ,$$

any organic block valence not bonded to a silicon containing block being bonded to R— and any silicon containing block valence not bonded to an organic block being bonded to $-SiR''_2Z$, in which R is a monovalent hydrocarbon radical having from 1 to 30 inclusive carbon atoms, R' is a monovalent radical selected from the group consisting of a hydrogen atom and a methyl radical, each R'' is a monovalent hydrocarbon or halogenated hydrocarbon radical both having from 1 to 18 inclusive carbon atoms, R''' is a divalent hydrocarbon radical having from 2 to 30 inclusive carbon atoms, Z is a monovalent radical selected from the group consisting of R'' radicals, hydroxyl radicals and hydrolyzable radicals, G is a monovalent radical selected from the group consisting of $-CH{=}CH_2$, $-C(CH_3){=}CH_2$, $-CH{=}CHCH_3$, $-C_3H_4N$, $-COOCH_3$, $-C\equiv N$, $-C(O)NR''_2$, $-COOCH_2CH_3$, and a monovalent aromatic radical consisting of from 1 to 3 benzenoid rings in which the benzenoid rings have up to 3 aliphatic organic substituents each of no more than six carbon atoms selected from the group consisting of alkyl radicals, cycloalkyl radicals and alkoxy radicals and no aliphatic organic substituent on said benzenoid ring bonded to the $$-\underset{|}{CR'}-$$

group and which is ortho to the $$-\underset{|}{CR'}-$$

group has more than one carbon atom, $x$ has an average value greater than 20, and $y$ has an average value greater than 20, said block copolymer having a molecular weight greater than 3,000, 2 to 98 weight percent being silicon containing units and 2 to 98 weight percent being units of the organic block.

The block copolymers of the present invention are best prepared by polymerizing a vinyl monomer, $CH_2{=}CR'G$ with an organolithium compound in a solvent solution. The amount of organolithium compound used per amount of vinyl monomer will determine the size of the organic block. The smaller the amount of organolithium compound per given amount of vinyl monomer, the greater the number of vinyl monomeric units in the resulting polymer. The reaction between the organolithium compound and the vinyl monomer should be carried out under conditions free from contaminations, such as water, air, oxygen, inhibitors, acidic impurities, greases and the like. The mixture of the vinyl monomer and the organolithium compound in solvent solution are maintained at a temperature below the reflux temperature of the mixture and above the freezing point of the mixture until the $CH_2{=}CR'G$ has disappeared. The reaction product from the reaction of the organolithium compound and the vinyl monomer is a lithium terminated polymer of the formula $$R(CH_2-\underset{G}{CR'})_x Li$$

where R, R', G and $x$ are defined above and where the organolithium compound used is a monolithium compound and $$Li(\underset{G}{CR'}-CH_2)_x R'''(CH_2-\underset{G}{CR'})_x Li$$

where R', R''', G and $x$ are defined above and where the organolithium compound used is a dilithium compound.

To the lithium terminated polymer solution, tris-3,3,3-trifluoropropyltrimethyl cyclotrisiloxane in solvent solution is added in an amount sufficient to provide at least one cyclotrisiloxane molecule for each lithium end, but the amount of cyclotrisiloxane should not exceed 40 percent of the total amount of cyclotrisiloxane to be added. The addition should be carried out so that there is no exposure of any of the solutions to previously stated impurities. The resulting product would be, for the most part, a polymer of the formula when the monolithium compound is used

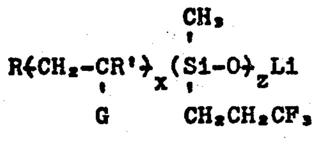

where R, R', G and $x$ are defined above and $z$ is 1, 2 or 3 and a polymer of the formula when the dilithium compound is used

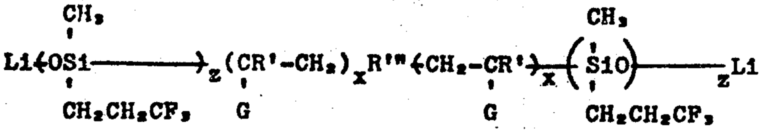

where R', R''', G and $x$ are defined above and z is 1, 2 or 3. The reaction is held at a temperature between the freezing point of the mixture and no greater than the reflux temperature of the mixture. After sufficient time has lapsed, which is at least 30 minutes preferably 1 to 4 hours and which is recognizable by the disappearance of the color characteristic for lithium ended vinylic polymers, additional tris-3,3,3-trifluoropropyltrimethyl cyclotrisiloxane in solvent solution and a

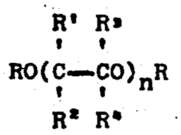

preferably in an amount of at least one weight percent based on the weight of the mixture is added to the lithium ended silicon containing copolymer. The amount of cyclotrisiloxane is added to provide the desired siloxane block size. The reaction mixture is preferably heated to 25° to 50°C. for 3 to 4 hours to increase the reaction rate. The reaction, however, can be carried out between -50°C. and the reflux temperature of the mixture for at least 30 minutes or greater. The resulting product has a formula when the monolithium compound is used

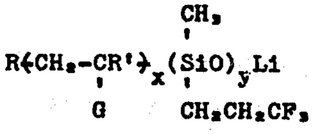

and a formula when the dilithium compound is used

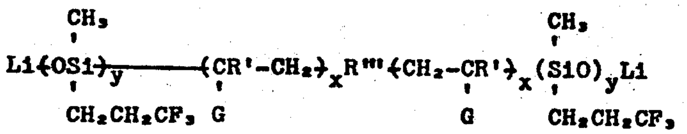

where R', R''', G, $x$ and $y$ are defined above. The block copolymer is then terminated by adding acetic acid to give a hydroxyl ended block copolymer of an organochlorosilane, $ZR''_2SiCl$, can be added to give a $-SiR''_2Z$ ended block copolymer. The amount of terminating agent is at least sufficient to provide one mole of terminating agent per mole of lithium atom.

The vinyl monomers suitable for the present invention include an aromatic compound containing 1 to 3 benzenoid rings having a

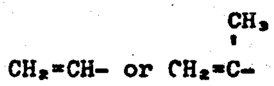

group attached to a benzenoid ring. The benzenoid rings can contain up to three substituents which include alkyl radicals, cycloalkyl radicals, and alkoxy radicals. The alkyl, cycloalkyl and alkoxy radicals contain no more than six carbon atoms and any substituent which is ortho to the

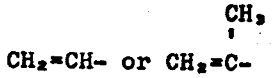

group contains no more than one carbon atom, thus a methyl radical. Examples of suitable vinyl aromatic compounds include, styrene, alpha-methylstyrene, o-vinyltoluene, m-vinyltoluene, p-vinyltoluene, 9-vinylanthracene, 4-phenylstyrene, 3,5-diphenylstyrene, 3-methyl-5-hexylstyrene, 4-cyclohexylstyrene, 1-vinylnaphthalene, 2-vinylnaphthalene, 3,4-diphenoxystyrene, 4-hexoxystyrene, 2-methyl-4-hexoxystyrene, 4,5-dimethyl-1-vinylnaphthalene, 3,5-diethylstyrene, 6-phenyl-2-vinylnaphthalene, 3-butyl-1-vinylnaphthalene, 4-propylstyrene, 4-(p-tolyl)styrene, 4-(4-phenyl-n-butyl) styrene, 3-(3-pentylphenyl)styrene, 6-isopropyl-1-vinylnaphthalene, 3-p-tolyl-1-vinylnaphthalene, and

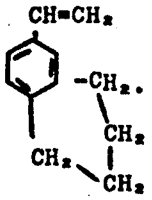

Vinyl monomers also suitable for the present invention include butadiene, isoprene, 2,3-dimethylbutadiene, 1,3-pentadiene, 4-vinylpyridine, $CH_2=CHSiR''_3$, methylmethacrylate, ethylacrylate, acrylonitrile, methacrylonitrile and acrylamide.

The organolithium compounds suitable for use in the process for the preparation of the block copolymers of this invention include those compounds of a formula RLi where R is a monovalent hydrocarbon radical of 1 to 30 inclusive carbon atoms. Illustrative of the RLi compounds suitable for use herein, include, methyllithium, ethyllithium, n-propyllithium, isopropyllithium, n-butyllithium, n-hexyllithium, octadecyllithium, $CH_3(CH_2)_{29}Li$, naphthyllithium, anthracyllithium, benzyllithium, phenyllithium, tolyllithium, xylyllithium, n-decyllithium, cyclohexyllithium, 4-butylphenyllithium, 4-cyclohexylbutyllithium, 4-phenylbutyllithium and octyllithium. Also the organolithium compounds suitable for use in the process for the preparation of the block copolymers of the present invention include those compounds of a formula Li—R'''—Li where R''' is a divalent hydrocarbon radical having from 2 to 30 inclusive carbon atoms. Illustrative of the LiR'''—Li compounds suitable for use herein, include, dilithiostilbene, 1,4-dilithiobenzene, 1,5-dilithiopentane, 1,5-dilithionaphthalene, 1,2-dilithio-1,3,3-triphenylpropane.

The vinyl monomers and the organic solvents should be washed, dried, and/or distilled prior to use to remove any impurities such as water, inhibitors and the like. Suitable organic solvents include the hydrocarbon solvents which are solvents for the vinyl monomers such as cyclohexane, toluene, benzene, n-hexane, mineral spirits, methylcyclohexane, xylene, n-butane, n-heptane, isooctane and cyclopentane.

R is a monovalent hydrocarbon radical having 1 to 30 inclusive carbon atoms, examples of which include, methyl, ethyl, n-propyl, isopropyl, n-butyl, amyl, n-hexyl, octadecyl, triacontyl, naphthyl, anthracyl, benzyl, phenyl, tolyl, xylyl, n-decyl, cyclohexyl, 4-butylphenyl, 4-cyclohexylbutyl, 4-phenylbutyl and octyl.

R' is either a hydrogen atom or a methyl radical. R''' is a divalent hydrocarbon radical having from 2 to 30 inclusive carbon atoms, for example ethylene, pentylene, octylene, divalent radicals of stilbene, benzene, naphthalene and 1,3,3-triphenylpropane.

G is a monovalent radical selected from $-CH=CH_2$, $-C(CH_3)=CH_2$, $-CH=CHCH_3$, $-COOCH_3$, $-C\equiv N$, $-C(O)NR''_2$, $-COOCH_2CH_3$, $-C_5H_4N$ and a monovalent aromatic radical which contains 1, 2 or 3 benzenoid rings. The benzenoid rings have up to three aliphatic organic substituents each having no more than six carbon atoms per substituent. Any substituent of the monovalent aromatic radical which is in the ortho position to the

contains no more than one carbon atom per substituent. Examples of G include,

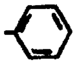 , 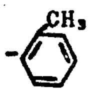 , 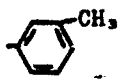 , 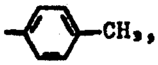 , 

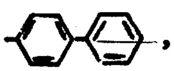 , 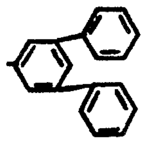 , 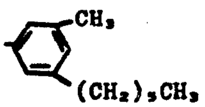 ,

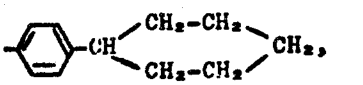 ,  , 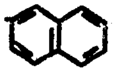 ,

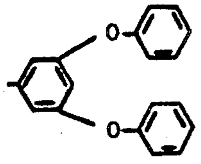 , 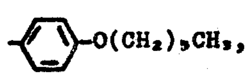 , 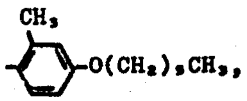 ,

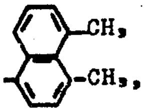 , 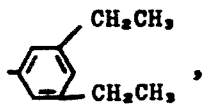 , 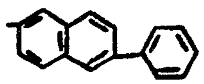 , 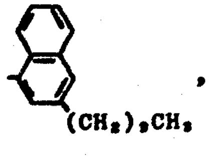 ,

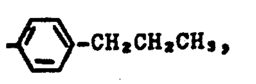 , 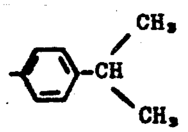 , 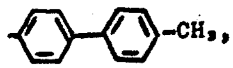 ,

 , 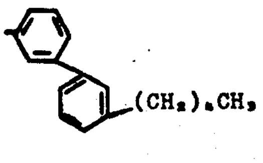 ,

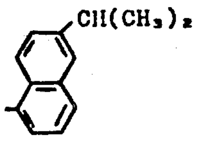,

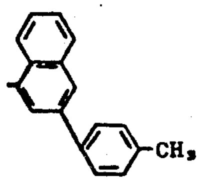,

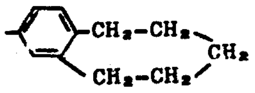 and

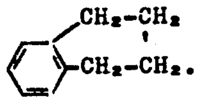,

The amount of the organolithium compound used can be readily approximated by dividing the weight of the vinyl monomer to be used by the molecular weight of the organic block desired. The results provide the number of moles of organolithium compound which is to be used. Since the reaction goes to almost 100% conversion and if the undesirable impurities have been carefully removed, the number average molecular weight obtained will be very close to the desired molecular weight used in determining the number of moles of organolithium compound to be used. It is to be understood that some combinations of organolithium compounds and vinyl monomers as well as certain conditions will deviate somewhat in the results from those calculated, since the percent conversion can vary. It is also to be understood that mixtures of the vinyl monomers can be polymerized or one vinyl monomer can be polymerized and then another vinyl monomer can be added and polymerized.

The organic solvent for the solution of the tris-3,3,3-trifluoropropyltrimethylcyclotrisiloxane can be any of those stated above for use during the polymerization of the vinyl monomer. The polymerization promoters can be tetrahydrofuran, $CH_3OCH_2CH_2OCH_3$, $CH_3O(CH_2CH_2O)_2CH_3$, $CH_3O(CH_2CH_2O)_3CH_3$ or $CH_3(CH_2CH_2O)_4CH_3$.

The $ZR''_2SiCl$ compounds can be any of the monochlorosilanes where each R'' is a monovalent hydrocarbon radical having 1 to 18 inclusive carbon atoms such as methyl, ethyl, vinyl, allyl, cyclohexyl, phenyl, xenyl, tolyl, octadecyl, naphthyl, isopropyl, butyl, hexyl, decyl, beta-phenylethyl and the like and Z may be a monovalent hydrocarbon radical as R'' or a hydrolyzable group such as alkoxy, diorganoamino, halogen, acyloxy and the like.

The block copolymers of the present invention can have a formula, as illustrated by some specific types below,

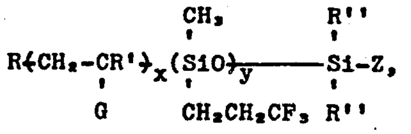,

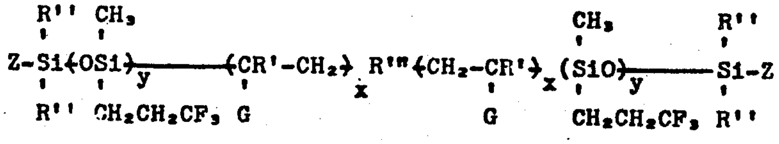

in which R, R', R'', R''', G, Z, $x$ and $y$ are defined above and are readily obtained in essentially nonrandom form when prepared as described herein. Essentially no homopolymer is obtained. The block copolymers of the present invention also include those prepared by the condensation of the block copolymers described above where Z is hydroxyl or those prepared by reaction with a chain extender such as diorganodichlorosilane, or a difunctional silane reactive with Z when Z is a hydroxyl radical or a hydrolyzable radical, such as dimethyldiacetoxysilane or diphenyldimethoxysilane. Such condensed block copolymers can be illustrated by the formula

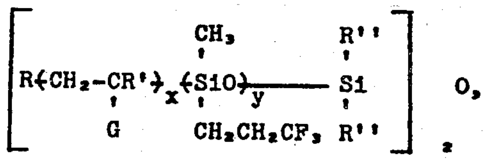,

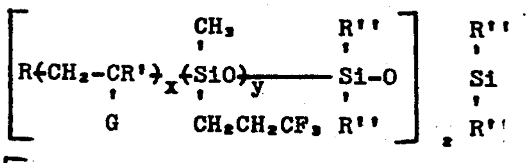,

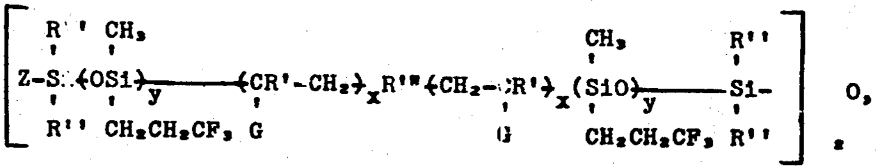

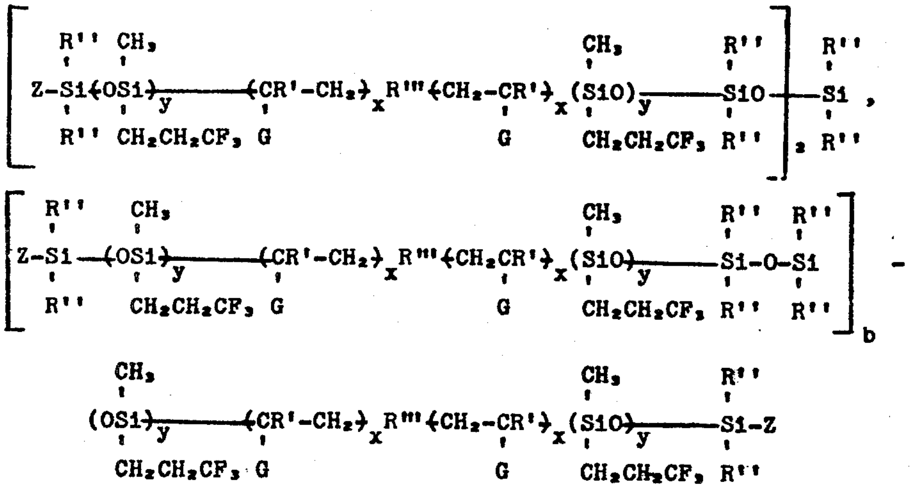

where *b* is 2 or greater and

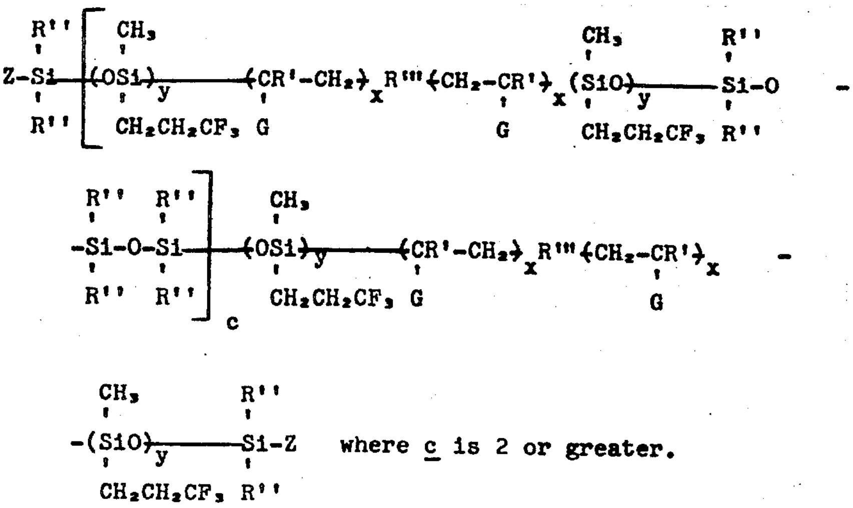

where c is 2 or greater.

The block copolymers of the present invention are exceptionally pure and rarely have more than 5 weight percent of either of the homopolymers in the block copolymer mixture and usually the amount of homopolymers is less than 2 weight percent.

The block copolymers of the present invention are essentially free of homopolymers and of narrow molecular weight distribution and also possess unique properties.

The block copolymers of the present invention have unique solubility properties. These block copolymers are soluble in tetrahydrofuran and dichloromethane and provide clear solutions.

The block copolymers of the present invention are useful for blending with either of the homopolymers represented by the individual blocks of the block copolymer to provide unique effects on the physical properties of the matrix. Thus, small amounts of the block copolymer dispersed in a homopolymer of a vinyl monomer increases the tensile strength, elongation and toughness compared to the homopolymer of the vinyl monomer without the added block copolymer. Amounts of block copolymer, such as 0.1 to 2 weight percent based on the weight of the homopolymer of the vinyl monomer produce the effects. Such blends of the block copolymer and vinyl homopolymer also have markedly improved toughness and impact strength over the vinyl homopolymer without the added block copolymer. It is to be understood that similar results are obtainable from blending the block copolymers of the present invention with various vinyl homopolymers, mixtures of vinyl homopolymers, copolymers of vinyl homopolymers and other organic polymers as long as the block copolymer of the present invention can be satisfactorily dispersed or blended therewith. The block copolymers of the present invention are readily uniformly dispersible in polyorganosiloxanes and in vinyl polymers, and form what can be considered a solid solution.

It is also understood that the block copolymers of the present invention can be used to disperse poly-3,3,3-trifluoropropylsiloxane in a matrix of a vinylic polymer whose composition matches that of the organic block. It is also understood that such blends when properly composed will improve the properties of the matrix.

The block copolymers of the present invention also increase the physical properties of poly-3,3,3-trifluoropropylmethylsiloxane elastomers without the addition of reinforcing fillers when added to silicon elastomer stocks.

The block copolymers of the present invention preferably have molecular weight of greater than 30,000 with 30 to 60 weight percent poly-3,3,3-trifluoropropylmethylsiloxane block and 40 to 70 weight percent vinyl polymer block.

The following examples are illustrative only and should not be construed as limiting this invention which is properly delineated in the claims.

EXAMPLE 1

The ingredients were all carefully purified before using. Styrene was freed from inhibitor and dried by passage through a bed of heat activated alumina. Tris-3,3,3-trifluoropropylmethylcyclotrisiloxane in benzene was dried by refluxing under a dry nitrogen purge followed by treatment with anhydrous calcium oxide. The benzene was purified by distillation from n-butyllithium. A solution of 100 g. (0.94 mole) of styrene in 200 g. of benzene was refluxed under a purge of purified nitrogen for 10 minutes. The solution was cooled and polymerization was initiated by the addition of 0.63 ml. of a 1.6 molar solution of n-butyllithium in hexane (0.001 mole). After 2 hours at ambient temperature the polymerization of the styrene was complete so a portion (50 ml.) of a solution of $[(CF_3CH_2CH_2)(CH_3)SiO]_3$, 100 g. (0.661 mole) in 600 g. of benzene was added. After one hour the characteristic red color of the polystyryllithium had disappeared. The remaining solution of the $[(CF_3CH_2CH_2)(CH_3)SiO]_3$ in benzene was then added together with 50 ml. of $CH_3O(CH_2CH_2O)_2CH_3$ and the solution was heated to 40° – 50°C. for 195 minutes at which time 87% of the $[(CF_3CH_2CH_2)(CH_3)SiO]_3$ had been consumed. The polymerization was then terminated by the addition of 1.5 ml. of $(CH_3)_2(CH_2{=}CH)SiCl$ followed by 1.0 g. of sodium bicarbonate. The solution was washed with water until neutral and then the block copolymer was precipitated by the addition of the solution to 3,000 ml. of ethanol. The precipitated block copolymer was washed twice with ethanol and then dried at 40°C. at 1 mm of Hg for 24 hours. The yield was 171.2 g. or 91.5%. The block copolymer had a formula

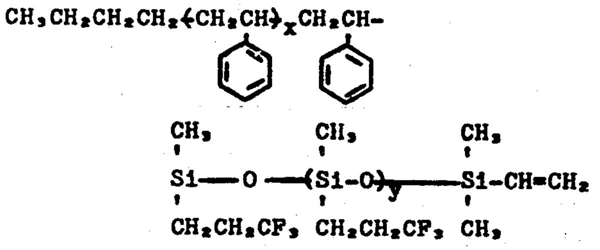

a number average molecular weight of 162,000 and was 40 weight percent polystyrene.

EXAMPLE 2

When the following ingredients as shown in the Table are substituted for the respective ingredients in Example 1, the indicated block copolymers are obtained which are equivalent to the block copolymer of Example 1.

TABLE

| | Vinyl Monomer | Organolithium Compound | Terminating Ingredient | Block Copolymer |
|---|---|---|---|---|
| A. | 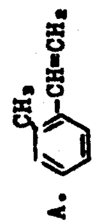 | $LiCH_3$ | $CH_3$<br>$ClSi-C_6H_5$<br>$CH_3$ | 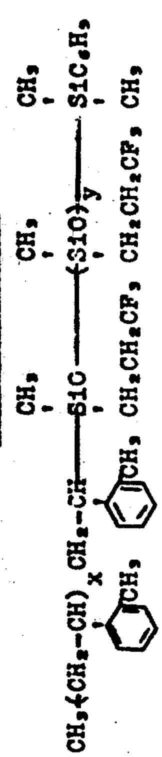 |
| B. | 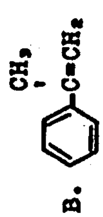 | $LiCH_2(CH_2)_6CH_3$ | Acetic Acid | 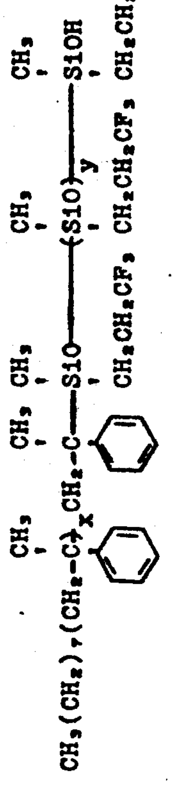 |
| C. | 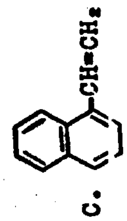 | 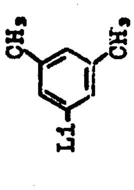 | $CH_2CH_3$<br>$ClSiCH_2CH{=}CH_2$<br>$CH_2CH_3$ | 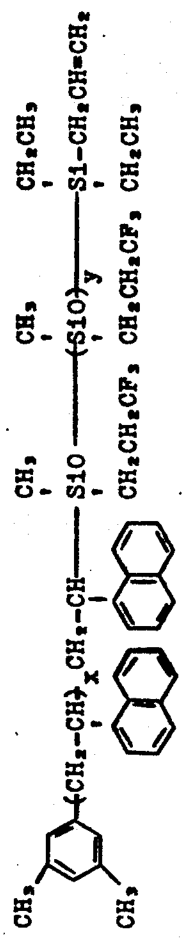 |

TABLE (Cont.)
| | Vinyl Monomer | Organolithium Compound | Terminating Ingredient | Block Copolymer |
|---|---|---|---|---|
| D. |  | $LiCH_2(CH_2)_{16}CH_3$ | $CH_3$<br>$ClSi(C_6H_5)_2$ | 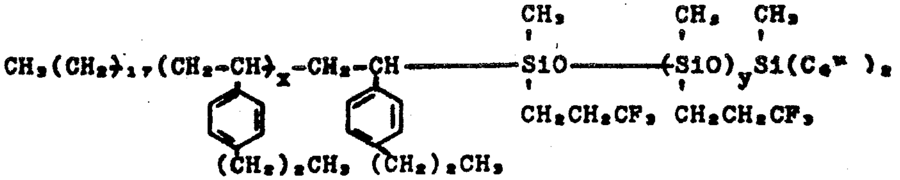 |
| E. | 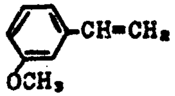 | $LiCH_2(CH_2)_{28}CH_3$ | $CH_3$<br>$ClSiCH=CH_2$<br>$C_6H_5$ | 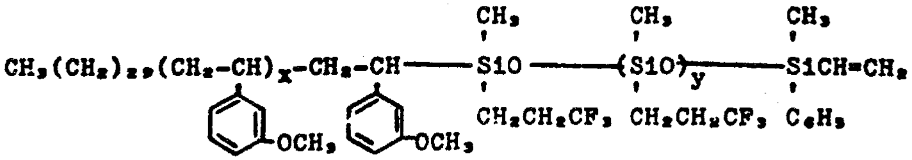 |
| F. | 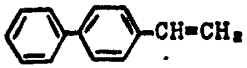 |  | $CH_3$<br>$ClSiC_{18}H_{37}$<br>$CH_3$ | 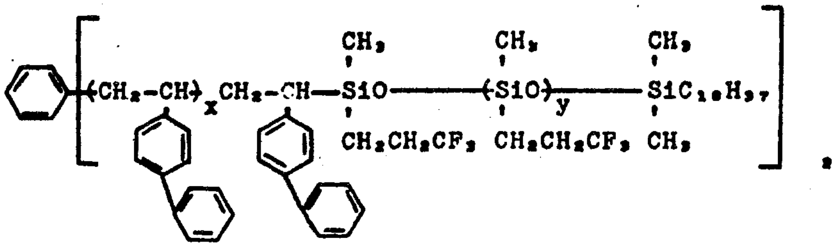 |
| G. | 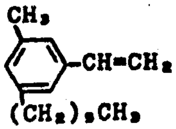 | 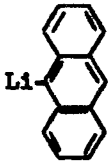 | 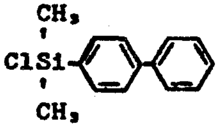 | 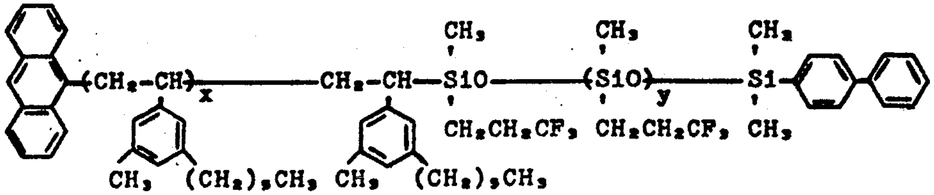 |

TABLE (Cont.)
| | Vinyl Monomer | Organolithium Compound | Terminating Ingredient | Block Copolymer |
|---|---|---|---|---|
| H. | 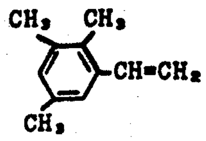 | 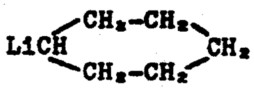 | 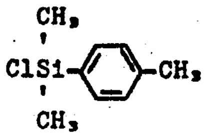 | 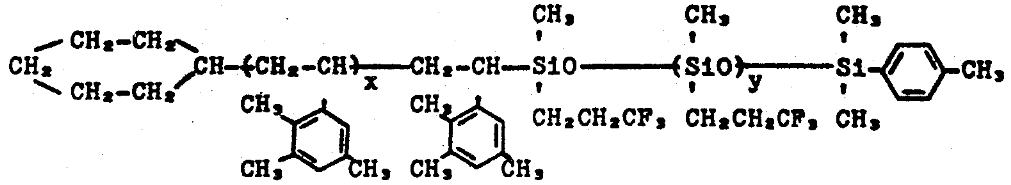 |
| I. | 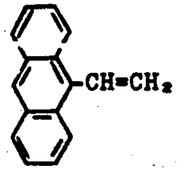 | 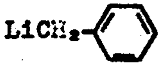 | 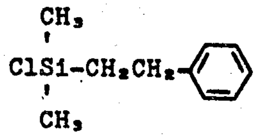 | 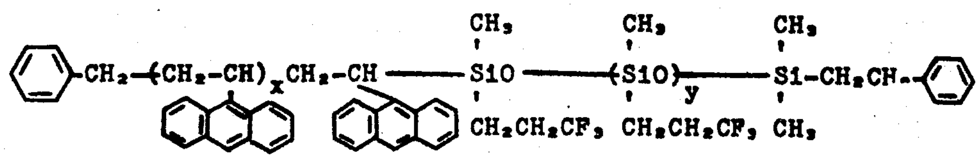 |
| J. |  | $LiCH(CH_3)_2$ | $C_6H_5CH_3SiClOC_6H_5$ | 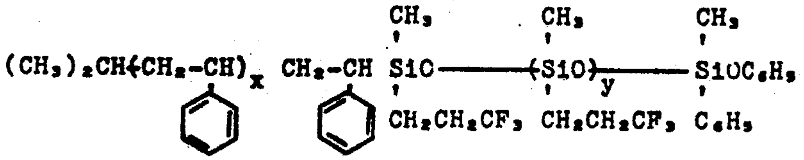 |
| K. | 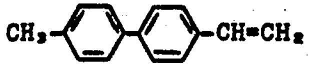 | 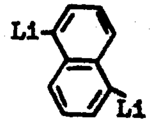 | 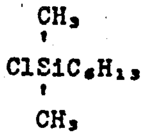 | 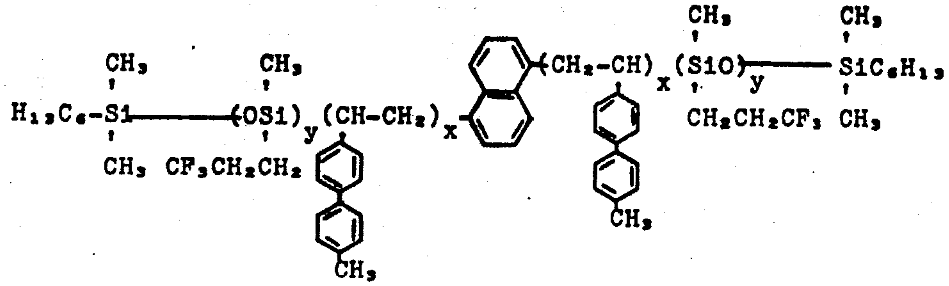 |

TABLE (Cont.)
| | Vinyl Monomer | Organolithium Compound | Terminating Ingredient | Block Copolymer |
|---|---|---|---|---|
| L. | 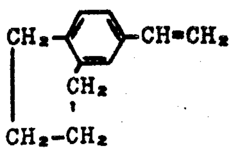 | 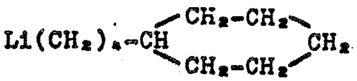 | Acetic Acid | 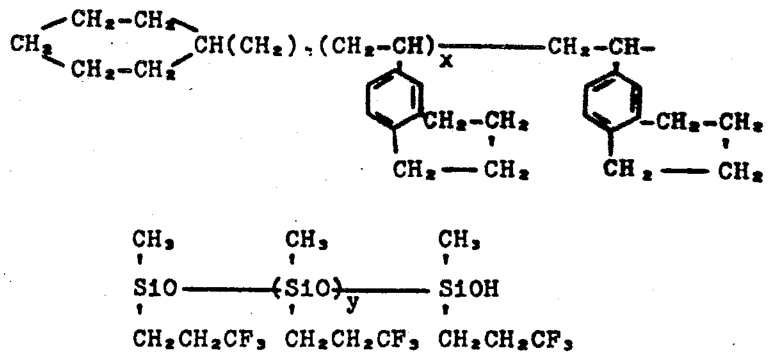 |
| M. | $CH_2=CH-CH=CH_2$ | $Li(CH_2)_3CH_3$ | $(CH_3)_3SiCl$ | 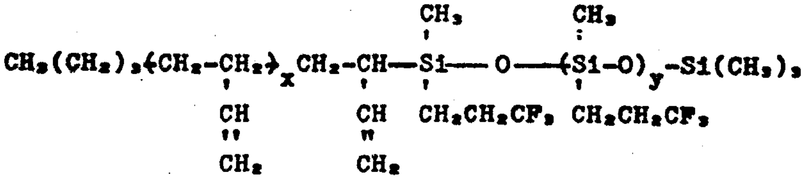 |
| N. | $CH_2=CH-C(CH_3)=CH_2$ | $Li(CH_2)_3CH_3$ | $(C_6H_5)_2SiClOC_4H_9$ | 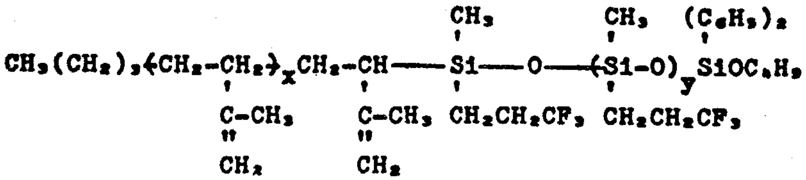 |
| O. | $CH_2=C(CH_3)-\overset{O}{\overset{\parallel}{C}}OCH_3$ | $Li(CH_2)_3CH_3$ | $(C_6H_5)_2\overset{Cl}{Si}-\overset{CH_3}{N}C_6H_5$ | 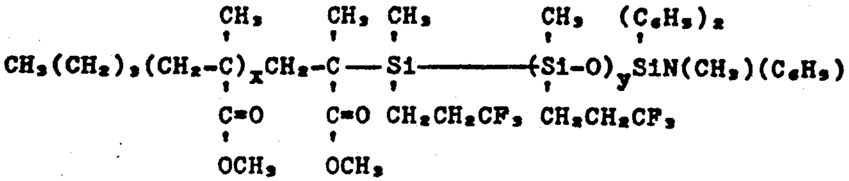 |
| P. | $CH_2=CH-C\equiv N$ | $Li(CH_2)_3CH_3$ | Acetic Acid | 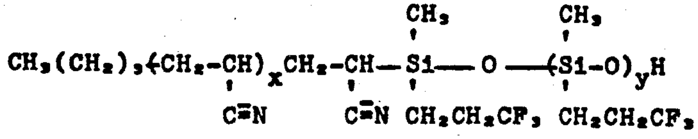 |

That which is claimed is:

1. A block copolymer consisting essentially of at least one organic block represented by the formula

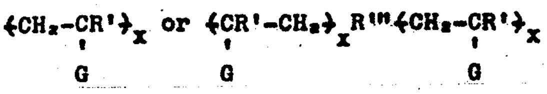

and at least one silicon containing block represented by the formula

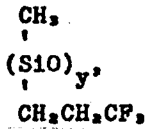

said organic block being bonded to said silicon containing block through silicon-carbon bonds, represented by the formula

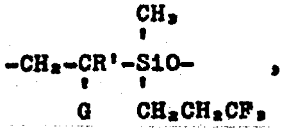

any organic block valence not bonded to a silicon containing block being bonded to R— and any silicon containing block valence not bonded to an organic block being bonded to $—SiR''_2Z$, in which R is a monovalent hydrocarbon radical having from 1 to 30 inclusive carbon atoms, R′ is a monovalent radical selected from the group consisting of a hydrogen atom and a methyl radical, each R″ is a monovalent hydrocarbon or halogenated hydrocarbon radical both having from 1 to 18 inclusive carbon atoms, R‴ is a divalent hydrocarbon radical having from 2 to 30 inclusive carbon atoms, Z is a monovalent radical selected from the group consisting of R″ radicals, hydroxyl radicals and hydrolyzable radicals, G is a monovalent radical selected from the group consisting of $—CH{=}CH_2$, $—C(CH_3){=}CH_2$, $—CH{=}CHCH_3$, $—C_3H_4N$, $—COOCH_3$, $—C \equiv N$, $—C(O)NR''_2$, $—COOCH_2CH_3$, and a monovalent aromatic radical consisting of from 1 to 3 benzenoid rings in which the benzenoid rings have up to 3 aliphatic organic substituents each of no more than six carbon atoms selected from the group consisting of alkyl radicals, cycloalkyl radicals and alkoxy radicals and no aliphatic organic substituent on said benzenoid ring bonded to the

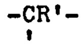

group and which is ortho to the

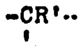

group has more than one carbon atom, *x* has an average value greater than 20, and *y* has an average value greater than 20, said block copolymer having a molecular weight greater than 3,000, 2 to 98 weight percent being silicon containing units and 2 to 98 weight percent being units of the organic block.

2. The block copolymer in accordance with claim 1 in which the molecular weight is greater than 30,000 inclusive.

3. The block copolymer in accordance with claim 1 in which R is a butyl radical, R′ is a hydrogen atom, G is a phenyl radical, each R″ is a methyl radical and Z is a vinyl radical.

4. The block copolymer in accordance with claim 2 in which R is a butyl radical, R′ is a hydrogen atom, G is a phenyl radical, each R″ is a methyl radical and Z is a vinyl radical.

* * * * *

UNITED STATES PATENT AND TRADEMARK OFFICE

CERTIFICATE OF CORRECTION

PATENT NO. : 3,873,636

DATED : March 25, 1975

INVENTOR(S) : JOHN C. SAAM ET AL.

It is certified that error appears in the above-identified patent and that said Letters Patent are hereby corrected as shown below:

Column 20, line 4, the formula "$-C_3H_4N$" should read --- $-C_5H_4N$ ---.

Signed and Sealed this

*sixth* Day of *January 1976*

[SEAL]

*Attest:*

RUTH C. MASON
*Attesting Officer*

C. MARSHALL DANN
*Commissioner of Patents and Trademarks*